United States Patent
Maqbool et al.

(10) Patent No.: US 9,515,447 B2
(45) Date of Patent: Dec. 6, 2016

(54) TITANIUM-DOPED AMORPHOUS ALUMINUM NITRIDE MICROLASER DEVICE AND METHOD FOR MAKING AND USING SAME

(75) Inventors: Muhammad Maqbool, Muncie, IN (US); Kyle Main, Parker City, IN (US)

(73) Assignee: Ball State Innovation Corporation, Muncie, IN (US)

( * ) Notice: Subject to any disclaimer, the term of this patent is extended or adjusted under 35 U.S.C. 154(b) by 105 days.

(21) Appl. No.: 13/399,662

(22) Filed: Feb. 17, 2012

(65) Prior Publication Data
US 2012/0274944 A1 Nov. 1, 2012

Related U.S. Application Data

(60) Provisional application No. 61/444,524, filed on Feb. 18, 2011.

(51) Int. Cl.
| | |
|---|---|
| *H01S 3/06* | (2006.01) |
| *H01S 3/063* | (2006.01) |
| *H01S 3/083* | (2006.01) |
| *H01S 3/094* | (2006.01) |
| *H01S 3/17* | (2006.01) |
| *H01S 3/16* | (2006.01) |

(52) U.S. Cl.
CPC ........... *H01S 3/0627* (2013.01); *H01S 3/0632* (2013.01); *H01S 3/061* (2013.01); *H01S 3/0621* (2013.01); *H01S 3/083* (2013.01); *H01S 3/094* (2013.01); *H01S 3/1625* (2013.01); *H01S 3/17* (2013.01)

(58) Field of Classification Search
CPC .... H01S 3/0627; H01S 3/0632; H01S 3/0621; H01S 3/1615; H01S 3/1616; H01S 3/1605; H01S 3/1608; H01S 3/1625; H01S 3/094; H01S 3/061; H01S 3/083

See application file for complete search history.

(56) References Cited

U.S. PATENT DOCUMENTS

| | | |
|---|---|---|
| 6,731,849 B1 | 5/2004 | Singh et al. |
| 7,058,103 B2 | 6/2006 | Ishida et al. |
| 7,609,737 B2 | 10/2009 | Matsumura et al. |
| 7,933,303 B2 | 4/2011 | Yoshizumi et al. |

(Continued)

OTHER PUBLICATIONS

Muhammad Maqbool, H. H. Richardson, P. G. Van Patten and M. E. Kordesch (2003). Luminescent Holmium Doped Amorphous AlN Thin Films for use as Waveguides and Laser Cavities.. MRS Proceedings, 798, Y5.8 doi:10.1557/PROC-798-Y5.8.*

(Continued)

*Primary Examiner* — Lynsey Crandall
*Assistant Examiner* — Nathan J Jenness
(74) *Attorney, Agent, or Firm* — Daniel L. Boots; Brian W. Chellgren; Bingham Greenebaum Doll LLP

(57) ABSTRACT

A microlaser system, including a microlaser, having an elongated generally cylindrical substrate, a thin dopant film encircling at least a portion of the substrate, and a pumping laser positioned to shine onto the thin film. The thin film is between about 2 and about 10 microns thick. When the pumping laser shines on the thin film, the thin film lases in whispering gallery mode. The dopant is preferably selected from the group including transition metals and rare-earth elements. In a most preferred embodiment, the thin film is titanium-doped amorphous aluminum nitride.

10 Claims, 5 Drawing Sheets

(56) References Cited

U.S. PATENT DOCUMENTS

| | | |
|---|---|---|
| 7,995,634 B2 | 8/2011 | Kitano et al. |
| 8,088,220 B2 | 1/2012 | Slack et al. |
| 2002/0125495 A1* | 9/2002 | Steckl et al. .................. 257/103 |
| 2008/0012038 A1* | 1/2008 | Teratani et al. .............. 257/103 |
| 2010/0014799 A1 | 1/2010 | Bulovic et al. |

OTHER PUBLICATIONS

M. Maqbool, K. Main, and M. Kordesch, "Titanium-doped sputter-deposited AlN infrared whispering gallery mode microlaser on optical fibers," Opt. Lett. 35, 3637-3639 (2010).*

Maqbool, Muhammad; Ahmad, I.; Richardson, H.H.; Kordesch, M.E., "Direct ultraviolet excitation of an amorphous AlN:praseodymium phosphor by codoped Gd3+ cathodoluminescence," Applied Physics Letters, vol. 91, No. 19, pp. 193511,193511-3, Nov. 2007.*

Frolov, S.V.; Vardeny, Z.V.; Yoshino, K., "Plastic microring lasers on fibers and wires," Applied Physics Letters, vol. 72, No. 15, pp. 1802,1804, Apr. 1998.*

Ribeiro, C.T.M., Alvarez, F. and Zanatta, A.R. (2002), Red and Green Light Emission From Samarium-Doped Amorphous Aluminum Nitride Films. Adv. Mater., 14: 1154-1157. doi: 10.1002/1521-4095(20020816)14:16<1154::AID-ADMA1154>3.0.CO;2-G.*

Muhammad Maqbool and Tyler Corn. Optical spectroscopy and energy transfer in amorphous AlN-doped erbium and ytterbium ions for applications in laser cavities. Optics Letters. vol. 35, No. 18 (2010).*

Muhammad Maqbool, et al., Titanium-doped sputter-deposited AlN infrared whispering gallery mode microlaser on optical fibers, Optics Letters, Oct. 26, 2010, pp. 3637-3639, vol. 35, No. 21, Optical Society of America, USA.

M. Maqbool, I. Ahmad, H.H. Richardson, and M.E. Kordesch, Applied Phys. Lett. 91 (2007), 193511.

S.V. Frolov, D. Chinn, Z.V. Vardeny, and K. Yoshino, Appl. Phys. Lett. 72 (1998), 1802.

* cited by examiner

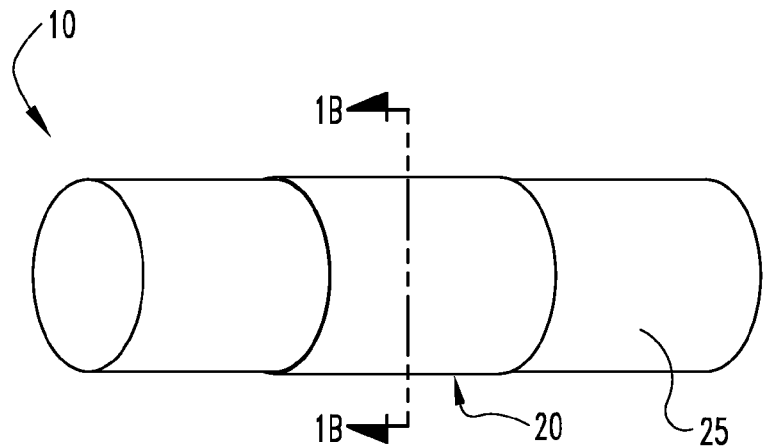
Fig. 1A
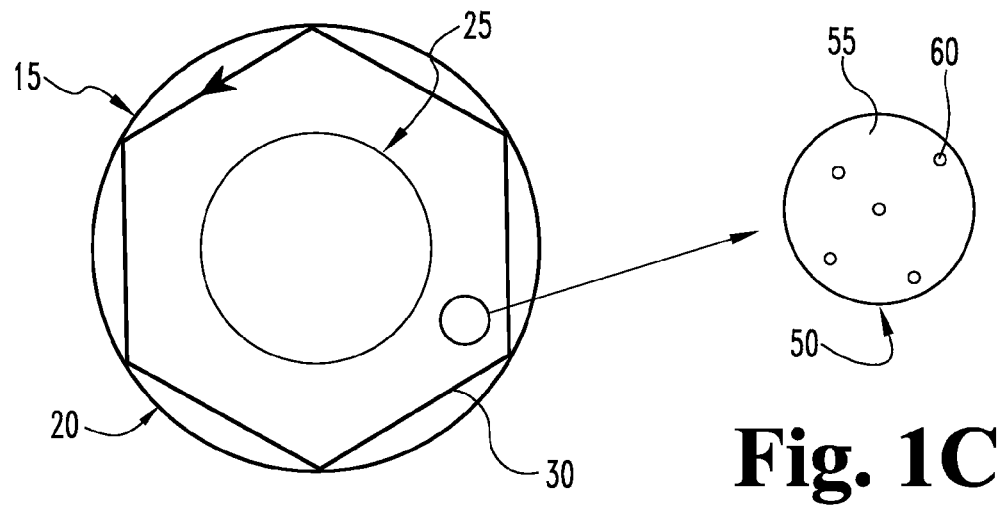
Fig. 1B
Fig. 1C

Path length is integral multiple of two different wavelengths

Path length is integral multiple of three different wavelengths

TITANIUM-DOPED AMORPHOUS ALUMINUM NITRIDE MICROLASER DEVICE AND METHOD FOR MAKING AND USING SAME

CROSS REFERENCE TO RELATED APPLICATION

This application claims the benefit of priority to U.S. Provisional Patent Application Ser. No. 61/444,524, filed Feb. 18, 2011, entitled METHOD AND SYSTEM FOR CONSTRUCTING AND OPERATING A TITANIUM-DROPED MICROLASER, the subject matter of which is expressly incorporated herein by reference.

FIELD OF THE INVENTION

This invention relates to materials science, and, more particularly, to more efficient and less expensive amorphous doped aluminum nitride microlasers.

BACKGROUND OF THE INVENTION

Rare-earth and transition metal doped III-nitride semiconductor thin films are attracting increasing attention as phosphor materials for use in optical displays, light-emitting diodes (LEDs) and other optical devices. Recent progress toward nitride-based light-emitting diodes and electroluminescent devices (ELDs) has been made using crystalline and amorphous GaN and AlN doped with a variety of rare-earth elements. The amorphous III-nitride semiconductors have an advantage over their crystalline counterparts because the amorphous materials can be grown at room temperature with little strain arising due to lattice mismatch. Amorphous III-nitride semiconductors may also be more suitable for waveguides and cylindrical and spherical laser cavities because of their lack of grain boundaries.

Laser diodes made from aluminum nitride (AlN) are a high-value goal for the optics industry, to be used in much the same way as gallium nitride (GaN) LEDs. Rare-earth doped glasses and insulating crystals have been extensively studied and developed for laser applications. AlN has not been given its due attention in the past, however, as a gain medium or laser material when doped with rare-earth elements and/or transition metals. While many kinds of laser cavities have been invented since the birth of the first laser in 1950s, different techniques have been attempted in the past to produce lasers with high-efficiency and low-input power. The use of lasers in biomedical applications has likewise grown. Nonetheless, a significant need still exists for less expensive, more versatile and more efficient different laser cavities. The present invention addresses these needs.

SUMMARY OF THE INVENTION

This invention is directed at producing a more efficient laser device requiring lower input energy for operation. More particularly, optical fibers typically about 12 microns in diameter may be coated with an approximately 4 micron thick layer of amorphous aluminum nitride (AlN) doped with about 1 atomic percent titanium (Ti). The AlN:Ti layer is typically deposited through sputter-deposition or the like. When optically pumped, such as by an Nd:YAG green laser at 532 nm, laser action may be observed in whispering gallery modes ("WGM") in the amorphous layer deposited around the fiber (typically in a ring or racetrack shape) at approximately 780.5 nm with a quality factor Q in excess of 1500. Other modes may also observed between 775 nm and 800 nm. The green laser light is confined in the amorphous film coating on the fiber. The primary and secondary modes typically give a mode separation of around 4.6 nm, while no waveguide modes are typically observed in the laser cavity.

The optical fiber and infrared (IR) microlasing action achieved by the above described microlaser device is unique in various ways. For example, the instant microlaser is the first titanium infrared laser in aluminum nitride (AlN). Also, the instant microlaser is the first titanium microlaser on an optical fiber. Further, the instant microlaser is likewise the first titanium-doped AlN laser obtained in a sputter-deposited thin film. The lasing material (AlN:Ti) in the form of a thin film utilized in the instant microlaser device was deposited by radio frequency (RF) magnetron sputtering and has exhibited lasing properties long after initial deposition and without degradation. Thus, the material is extremely stable from a practical application perspective. In addition, the optical fiber itself provides a cavity for lasing action. Moreover, both aluminum and titanium are abundant and inexpensive. Consequently, both materials can be obtained in mass quantity for the production of thin films for lasing purposes. Finally, as a microlaser, the size of the laser device is very small relative to conventional laser sources.

The laser provided by this invention has a number of beneficial practical applications, including security systems, speed measurement, infrared measurement, distance measurement, night vision, astronomy, information technology and signal applications, medical diagnoses and treatment, surgical applications, cosmetic applications, and the like.

One object of the present invention is to provide an improved laser device. Related objects and advantages of the present invention will be apparent from the following description.

BRIEF DESCRIPTION OF THE DRAWINGS

FIG. 1A shows a longitudinal view of an optical fiber provided by a first embodiment of the present invention, a semiconducting ring microlaser device.

FIG. 1B shows a cross-sectional image of the optical fiber of FIG. 1A.

DETAILED DESCRIPTION

Figure 2:
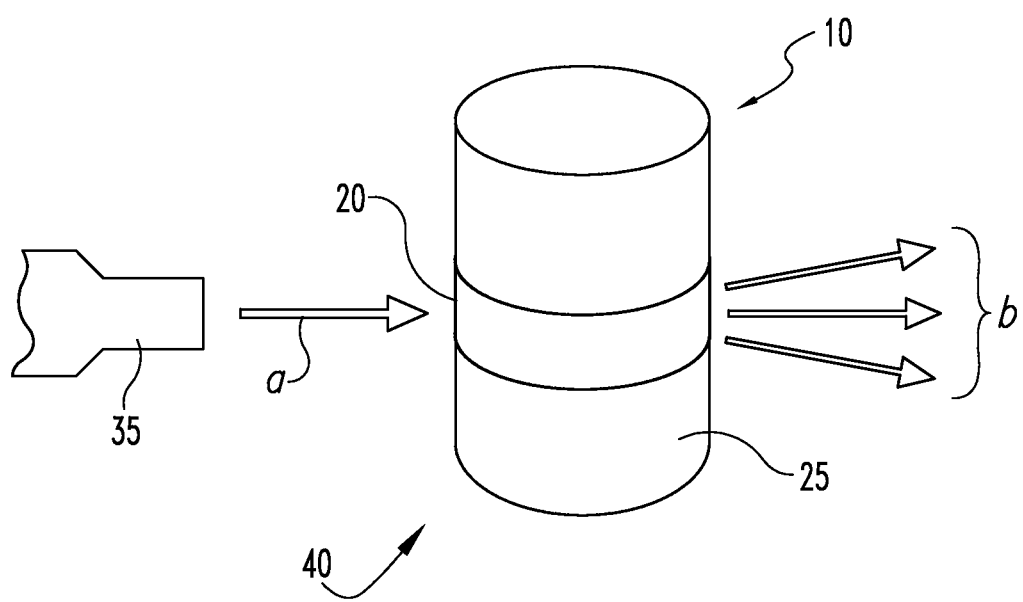
FIG. 2 schematically illustrates a second embodiment of the present invention, a microlaser system with the semiconducting ring microlaser device of FIG. 1 with a pump laser operationally coupled to the ring microlaser.

For purposes of promoting an understanding of the principles of the invention and presenting its currently understood best mode of operation, reference will now be made to the embodiments illustrated in the drawings. It will nevertheless be understood that no limitations of the scope of the invention is intended by the specific language used to describe the invention, with such alterations and further modifications in the illustrated device and such further applications of the principles of the invention as illustrated therein being contemplated as would normally occur to one ordinarily skilled in the art.

FIGS. 1A and 1B illustrate a first embodiment of the present invention, a titanium-doped amorphous aluminum nitride IR microlaser 10 mounted on a thin fiber. The microlaser 10 includes a laser cavity 15 defining a disk or ring-shaped outer structure 20 arranged around an inner, generally cylindrical structural portion 25, typically defined by an elongated fiber. The fiber 25 is typically an optical fiber, and is more typically optical glass. Typically, the outer portion 20 is deposited onto the inner portion 25. Typically, the outer portion 20 is a thin ring or shell made of titanium-doped AlN deposited onto an optical fiber 25, and subsequently stimulated IR emission can support whispering gallery modes (WGM). These modes result in multiple emission peaks in the near IR range and show gain accompanied by a low-excitation threshold.

The Ti-doped aluminum nitride films 20 can be grown pursuant to conventional techniques. The AlN:Ti amorphous film 20 is typically deposited using RF sputtering in pure nitrogen, although other convenient deposition techniques and environments may be chosen. Typical sputtering parameters are 120 W RF power with a 50 mm diameter pure aluminum target with a 4 mm diameter pure titanium slug placed in a hole made in the pure aluminum. Pressures between 5-8 mTorr nitrogen and a 100 mm source-to-substrate distance are typically elected. A stainless steel vacuum system uses a cryopump to reach a base pressure of preferably $1 \times 10^{-7}$ Torr (without bakeout). The film 20 thickness may be measured with a quartz crystal thickness monitor, scanning electron microscope, optical microscope, or the like. Thickness is typically measured to be around 4 μm for several of the films 20 deposited around or about the optical fibers 25. Generally, the thickness of the film 20 is at least about ⅔ the thickness of the diameter of the support fiber 25.

In one example, optical fibers of 80 microns diameter were pulled in a flame to reduce their diameter to about 12 microns to yield the inner portion 25. The typical length of a fiber 25 is between about 6 cm and 8 cm. The fibers 25 were then clamped in a rotating metallic substrate holder. The substrate holder included a cylindrical-shaped hole of about one-half inch diameter through which liquid nitrogen can be poured during the film-deposition procedure.

During the film-deposition process, the substrate is typically continuously rotated in order to achieve a uniform deposition around the fiber 25. Liquid nitrogen is also typically continuously supplied to yield amorphous films 20. AlN:Ti films 20 of three centimeters in length were then deposited on the end of the fiber 25 exposed to the target. Measured deposition rates were typically around 0.1 nm/second.

In one example, a 532 nm Nd:YAG laser of 35 mW maximum power was used to optically pump the microlaser device 10. The pumping beam, having a diameter of 2 mm, was focused 5 cm behind the portion of the optical fiber 25 upon which was deposited the AlN:Ti ring 20 to yield a microlaser device 10. A photoluminescence (PL) system was used to detect the fluorescence and laser action in the microlaser device 10. The PL system consisted of a CCD camera coupled with a spectrometer.

FIGS. 1A and 1B show one typical arrangement of the WGM in the outer portion 20 supported on an inner fiber substrate 25 of a laser device 10. The exterior ring portion 20 arranged about the fiber substrate 25 is preferably an AlN:Ti film deposited generally uniformly around the circumference of fiber 25. FIG. 1B is a cross-sectional view of the laser device 10, showing the amorphous AlN:Ti shell 20 positioned on the optical fiber 25. The diameter of the fiber substrate is typically about 12 microns and the thickness of the outer ring is about 4 microns, making the total diameter of the laser device 10 about 20 microns. The propagation path of light WGM 30 within the film 20 is graphically represented. The pattern of light propagation 30 is restricted to the AlN:Ti film 20 only, without the propagating light touching the fiber 25 itself, as defined by the whispering gallery mode (WGM).

Figure 3:
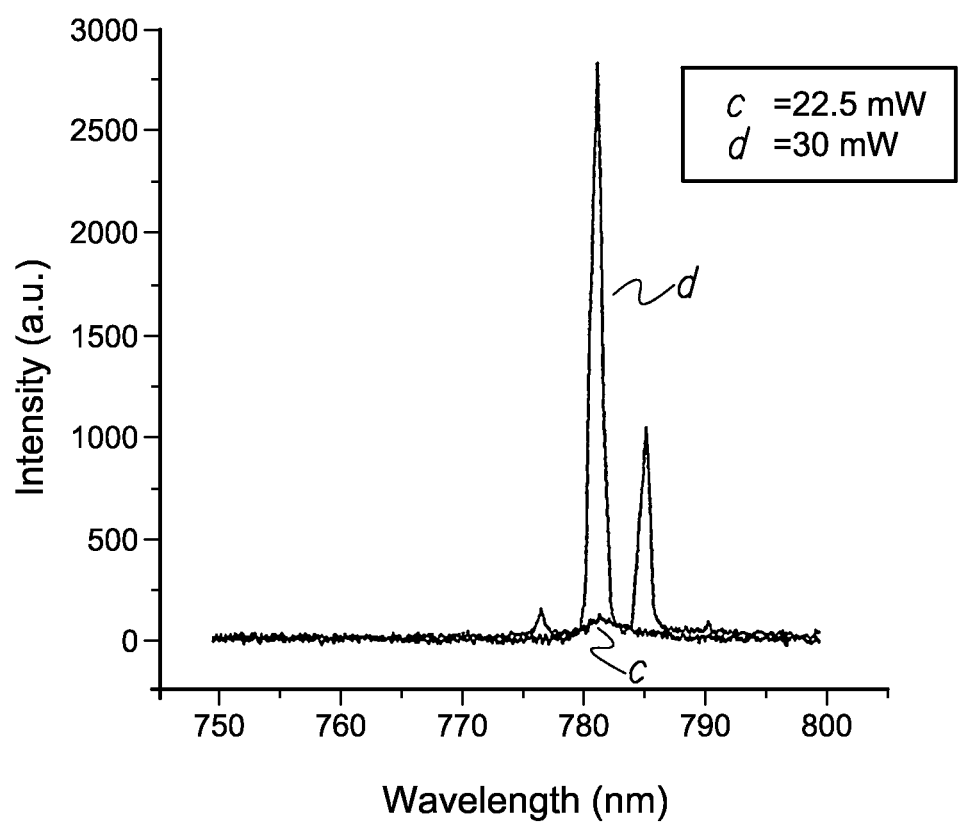
FIG. 3 is a graphic illustration of the laser action at 780.5 nm in AlN:Ti thin film disposed around the optical fiber of FIG. 1A.

FIG. 2 depicts another embodiment of the present invention, wherein a pump laser 35 is operationally coupled to the doped aluminum nitride ring 20 disposed around the optical fiber 25 to stimulate emission and defining a microlaser system 40. FIG. 3 shows the band narrowing and laser action in AlN:Ti films 20 deposited about the elongated optical fiber 25 as excited, for example, by a 532 nm Nd:YAG laser 35. The power of the excitation laser 35 is varied between 7.5 mW and 30 mW. FIG. 3 also shows two emission spectra, "c" and "d". The broad spectrum showing just the fluorescence emission "c" from the deposited films 20 was obtained when the Nd:YAG laser 35 is used for excitation with an output power of 15 mW. This broad emission spectrum is about 20 nm wide and no lasing action is observed in this spectrum under a threshold of 15 mW excitation output power. The sharp and relatively intense emission, indicated by "d", with narrow bandwidth shows lasing action in the film 20. The laser output of the system 40 is produced in the whispering gallery mode at approximately 780.5 nm. The secondary modes in this spectrum were also observed, confirming the resonances in the lasing action of the device 10. The primary mode lasing and the secondary mode emission peak show gain of about twenty (20) at an input power around 30 mW.

Figure 4:
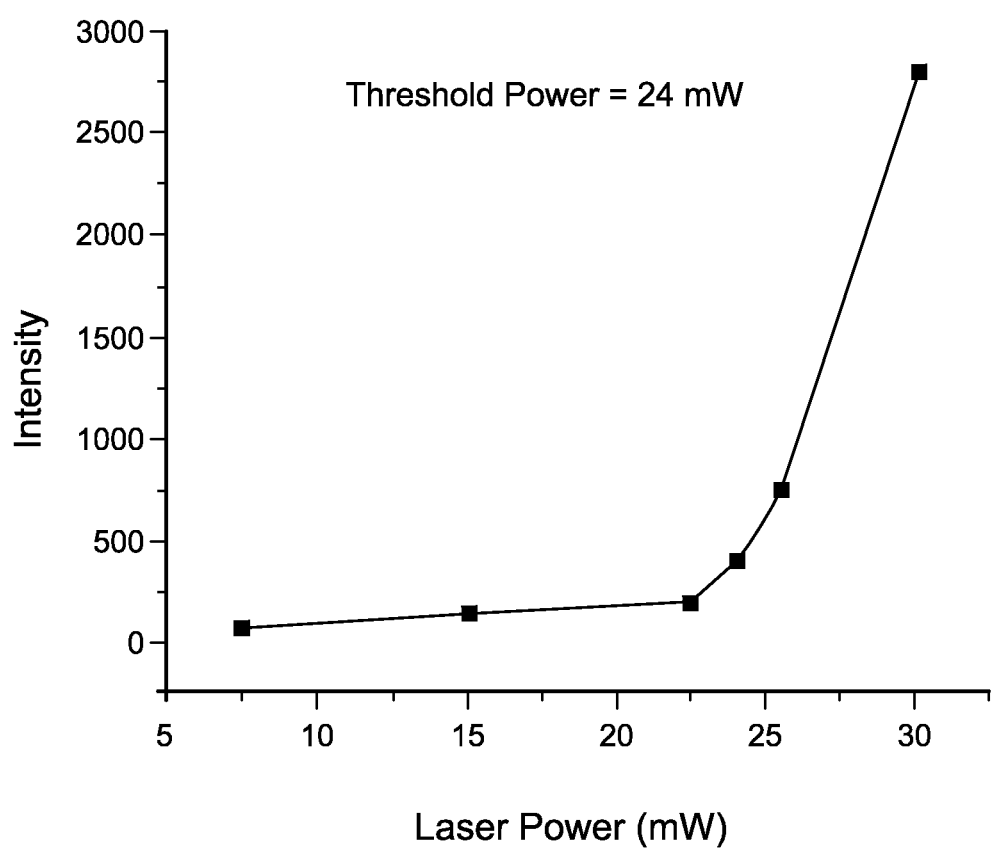
FIG. 4 is a graphic illustration of the increase in the intensity of the near-IR laser of FIG. 1A with increasing power of a pump laser.

FIG. 4 depicts an increase in the observed near infrared laser output in the AlN:Ti portion 20 with the increasing power of Nd:YAG excitation laser 35. The curve shows that no lasing is achieved in AlN:Ti ring 20 if the power P of the excitation laser 35 is less than a threshold value $P_0$. For $P > P_0$, an almost linear increase in the titanium microlaser 10 output is observed with increasing excitation laser 35 power. The threshold power $P_0$ was found to be about 23.5 mW. For $P < P_0$, a fluorescence emission from the optical fiber 25 with an emission width of 35 nm can be observed.

In micro-ring cavities 15, the thin AlN:Ti film 20 deposited around the optical fiber 25 supports WGM propagation 30 as shown in FIG. 1. The angular momentum mode number (n) for a WGM is given by equation (1) below, where D is the radius of the sphere, $\lambda_n$ is the wavelength of the WGM and m is the index of refraction for the AlN film 20:

$$n = \pi D m / \lambda_n \quad (1)$$

For amorphous AlN, the refractive index in the near infrared region (780 nm) is 1.95. This value of the index of refraction of amorphous AlN was experimentally obtained using films deposited in the same deposition system and the same conditions discussed above. Thus, m=1.95 was found to be a preferred value. Experimental results satisfy the given equation for the integers n=157. Because the film 20 deposited around the optical fiber 25 is thick enough to satisfy the WGM condition (d/D≥0.2), waveguide modes are generally not observed. The AlN:Ti doped optical fiber laser device 10 is preferably placed in a vertical direction so that the ring laser formation occurs in a horizontal axis. The resonance wavelength $\lambda_n$ should also support the mode separation $\Delta\lambda$ equation (2) below:

$$\Delta\lambda = \lambda_n - \lambda_{n+1} = \lambda^2/\pi Dm \quad (2)$$

Using n=156, the outer diameter D=20 micron, and m=1.95, equation (2) gives $\Delta\lambda$=4.9 nm. FIG. 4 discussed above depicts experimental results given $\Delta\lambda$=4.6, which is in agreement with theoretical calculations.

Typically, the device 10 has a thickness of less than about 30 microns, because as the film 20 increases in thickness, it becomes more difficult to cool the semiconducting material sufficiently rapidly to avoid crystallization and maintain its amorphous state. The device 10 may be made to any convenient thickness, however, so long as the film 20 may be maintained as an amorphous semiconducting material. Again, typically, the thickness of the film 20 is about ⅔ that of the support fiber 25.

In the examples herein, the film 20 is typically AlN. However, the film 20 may be any semiconducting material that is amorphous and that has a sufficiently wide band gap so as to not absorb the pumping energy to the extent that the dopant materials cannot be excited. Typically, the semiconducting film 20 is composed of a column IIIB nitride, although it may be a column IVB semiconductor, a column IIIB/column VB binary compound, or the like.

In general, the microlaser device 10 includes a lasing medium 50 defined as amorphous aluminum nitride 55 with a cation dopant 60 as shown in the exploded view of FIG. 1B. Titanium as a dopant 60 in the aluminum nitride 55 lasing medium 60 may be excited to produce discrete emissions with wavelengths falling in the infrared (IR) portion of the spectrum. Although the examples above contemplate titanium as the dopant 60 in the aluminum nitride 55 medium 60, other dopants 60 may be selected to produce laser outputs having other desired wavelengths. Typically, the dopant 60 is a rare earth element or a transition metal. For example, praseodymium (Pr) may be excited to emit photons in the blue, green and red wavelengths; holmium (Ho) may be excited to emit photons in the blue, green, red and IR wavelengths; samarium (Sm) may be excited to emit photons in the yellow, orange and red wavelengths; thulium (Tm) may be excited to emit photons in the blue and IR wavelengths terbium (Tb) may be excited to emit photons in the blue, green, orange and red wavelengths; and erbium (Er) may be excited to emit photons in the green and IR.

The geometry of the ring 20 determines which signal, if any, survives and is reinforced. The photons generated in the ring 20 via excitation of the dopant atoms are internally reflected around the outer surface of the ring 20, and if the total distance travelled for one complete circuit is equal to an integral multiple of the photon's wavelength, constructive interference occurs and a laser signal is generated; if the distance is not an integer multiple, the signal attenuates and extinguishes.

Figure 5A:
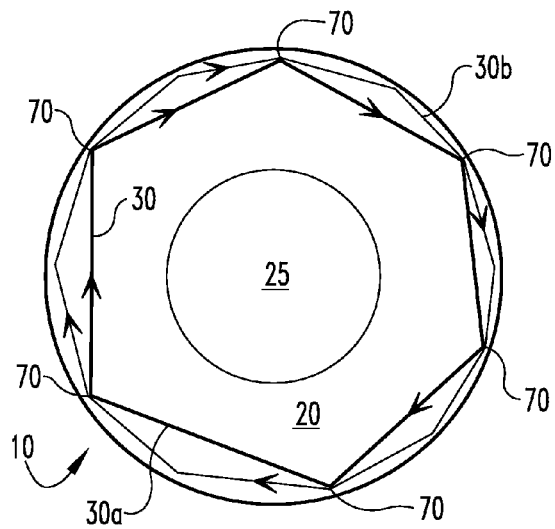
FIG. 5A is schematic of a third embodiment of the present invention, a semiconducting ring laser device supporting simultaneous lasing in two discrete wavelengths.
Figure 5B:
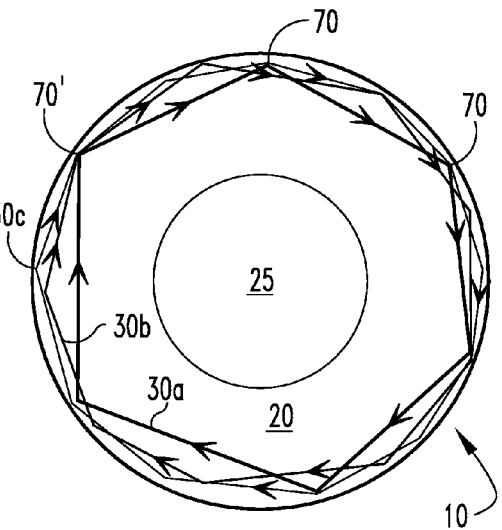
FIG. 5B is schematic of the embodiment of the FIG. 5A, showing a semiconducting ring laser device supporting simultaneous lasing in three discrete wavelengths.

As illustrated in FIGS. 5A and 5B, the ring 20 will generate laser output at the reflection points 70 within the ring 20. Because internal reflection is not perfect, a portion of the photon beam, typically about 4 or 5 percent, escapes through the ring 20 and is emitted as a laser signal. If the dopant atoms 60 have a plurality of excitation modes and can be excited to generate photons of two or more discrete wavelengths, multiple laser signals of different discrete wavelengths may be generated if the ring 20 exterior defines a reflection path equal to an integer multiple of the wavelengths of the two or more discrete wavelengths of the respective excited photons, as calculated by equations 1 and 2 above. This principle applies equally in instances where two or more dopants are present in the AlN 55 (or like material) ring 20.

In FIG. 5A, the same path length is an integral multiple of two different light waves 30a and 30b of different wavelengths. In FIG. 5B, the same is true for three different wavelengths 30c, 30d and 30e originating at 70' and coming back to the same starting point 70' in each round trip. For example, the path length in one case may be an integral multiple of 780.4 nm (with n=157) for the subject laser. At the same time, this path length is also an integral multiple of 467.6 nm (with n=262) and satisfies equation (1). This 467.6 nm blue emission occurs from thulium ions ($Tm^{+3}$) when doped in aluminum nitride (AlN). Thus, if an AlN ring 20 is co-doped both titanium and thulium in AlN, a blue ring laser in 467.6 nm from thulium ions as well as an infrared ring laser in 781.5 from titanium ions may be simultaneously generated. Thus, puming/pumping with the relevant laser 35 but from the same ring 20 two different laser outputs may be generated.

Figure 6:
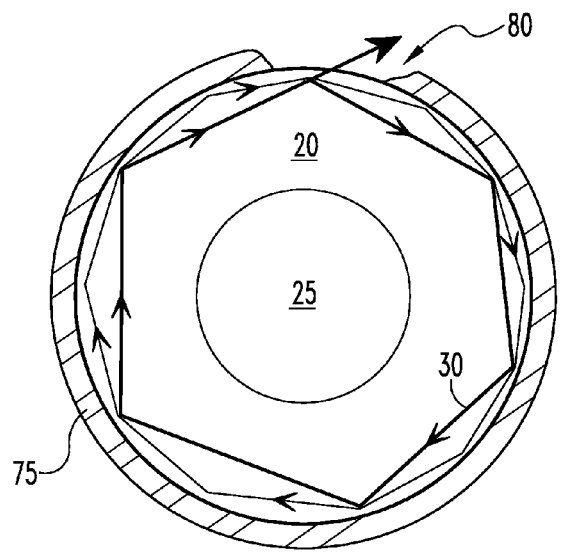
FIG. 6 is a schematic of a fourth embodiment of the present invention, a semiconducting ring laser device including outer partial opaque cladding over the semiconducting ring portion.

Further, as shown best in FIG. 6, since the ring 20 emits laser output at the discrete harmonic reflection points therearound, the ring 20 may be partially clad in an opaque cladding layer 75, such as a partial metal sheath, defining a gap 80 to prevent laser emission from all but the gap portion 80 such that the laser emission may be more easily directed toward a specific target.

The quality factor Q of the preferred cavity of this invention can also be determined, and is preferably found to be Q>1500. This is a relatively high value for a quality factor, suggesting that the laser device 10 is useful for practical applications. If v is the wave number and $\Delta_{1/2}v$ is the cavity resonance line halfwidth, then Q can be determined by the following equation (3):

$$Q = v/\Delta_{1/2}v \quad (3)$$

In one case $v=c/\lambda=3\times10^8$ (m/s)/$780.5\times10^{-9}$=12812 $cm^{-1}$, and from the measurement of the resonance line halfwidth $\Delta_{1/2}v$=8.5 $cm^{-1}$. This gives the quality factor of the laser cavity 15 to be Q>1500. For lasing action, $\Delta_{1/2}v<\Delta v/2$; otherwise, no separate laser lines are generally observed. In this case $\Delta_{1/2}v$=36.7 $cm^{-1}>\Delta_{1/2}v$=8.5 $cm^{-1}$ and, hence, separate laser lines are observed.

Since in WGM the light travels inside the deposited film 20 without substantially interacting with the fiber 25, the surface roughness of the underlying fiber substrate 25 does not affect the propagation of the light. Thus, it may be possible to use a metallic conducting fiber substrate 25 to support an AlN:Ti film 20, making it possible to excite lasing in the film 20 by introducing electrical energy through the fiber 25 itself, and a low input threshold laser 10 may thereby be formed.

The microlaser provided by this invention is very promising for use in biomedical applications. The laser may likewise be beneficial in the field of optics and photonics as well, with additional applications in medicine and health sciences for diagnostic and therapeutic purposes. For example, near infrared light with a wavelength between 700 nm and 900 nm has minimum absorption yet maximum penetration in body tissues. The laser 10 produces output at around 780.5 nm, which is within this range, and has high-penetration ability in the human body. Thus, the laser 10 is promising for diagnosis of deep-tissue abnormalities or tumors, as well as in laser surgeries of deep-body tissues.

The system 40 is potentially scalable to even smaller sizes, such as to yield laser devices 10 having diameters of only a few microns, or even smaller in the 100 nanometer range or less. Such small laser devices 10 could be made in quantity and, for example, deposited at tumor sites within a body for excitation by a pumping laser 35, electrical current or the like, with the high gain output directed to destroy the tumor while preserving surrounding healthy tissue. In operation, a tumor may be treated by first identifying a tumor to be destroyed, then positioning a plurality of microlaser devices 10 at the tumor site, wherein each respective microlaser 10 is constructed as discussed above. The microlasers 10 are energized, such as by a low energy pumping laser 35, electrically, or the like, and the amplified laser output signals are directed onto the tumor, at least partially destroying the tumor. After the treatment session is finished, the microlasers 10 are de-energized. Treatment may be repeated as desired, with no ill effects from the implanted laser devices 10 occurring in the interim. Further, if the laser devices 10 include rings 20 formed on bioglass fibers 25, the bioglass fibers will eventually dissolve in vitro, leaving only the rings 20 themselves as the laser devices 10.

In one embodiment, the fiber portion 25 is formed of bioglass, such that upon placement in vitro, such as at a tumor cite, the fiber portion 25 may be dissolved away to deposit unsupported rings 20 at the tumor site. The rings 20 may then be pumped by a low power pumping laser at a wavelength that readily penetrates flesh without doing substantial damage, while the laser output of the rings 20 is at a wavelength and power to destroy at least a portion of the tumor. The destructive potential of the rings 20 may thus be turned on and off at will.

In another embodiment, the fiber portion 25 is metallic, and lasing in the ring 20 is stimulated by electrical energy directly in the metallic fibers 20 by either conduction or induction.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A microlaser apparatus, comprising:
   an amorphous aluminum nitride ring; and
   a dopant distributed homogeneously in the amorphous aluminum nitride ring, wherein the dopant is Ti;
   wherein the amorphous aluminum nitride ring has a diameter of 20 microns; and wherein the dopant is present in a concentration of 1 atomic percent.

2. The microlaser of claim 1 wherein energizing the dopant stimulates photon emission to yield laser output from the amorphous aluminum nitride ring.

3. The microlaser of claim 1 further comprising a support fiber extending through the amorphous aluminum nitride ring.

4. The microlaser of claim 3 wherein the support fiber is glass.

5. The microlaser of claim 1 wherein the microlaser is operationally connected to a system chosen from the group consisting of security systems, speed measurement systems, thermometers, distance measurement systems, night vision systems, astronomy systems, information technology systems, and signal application systems.

6. A semiconducting microlaser apparatus, comprising:
   a cylindrical support fiber;
   an amorphous semiconducting ring disposed around the support fiber; and
   a dopant distributed homogeneously in the amorphous semiconducting ring, wherein the dopant is Ti;
   wherein the dopant is present in a concentrations of 1 atomic percent.

7. The semiconducting microlaser apparatus of claim 6, wherein the amorphous semiconducting ring has a diameter of 20 microns.

8. The semiconducting microlaser of claim 6 wherein energizing the dopant stimulates photon emission to yield laser output from the amorphous semiconducting ring.

9. The semiconducting microlaser of claim 6 wherein the support fiber is glass.

10. The semiconducting microlaser of claim 6 wherein the support fiber is a metallic electrical conductor.

* * * * *